United States Patent [19]

Iwatsuka et al.

[11] Patent Number: 5,580,445
[45] Date of Patent: Dec. 3, 1996

[54] CONTINUOUS ION EXCHANGE APPARATUS

[75] Inventors: Takeshi Iwatsuka; Kazuhiko Shimizu, both of Toda, Japan

[73] Assignee: Organo Corporation, Tokyo, Japan

[21] Appl. No.: 364,678

[22] Filed: Dec. 27, 1994

[30] Foreign Application Priority Data

Dec. 27, 1993 [JP] Japan .................................. 5-331649

[51] Int. Cl.$^6$ ................................................ B01J 47/14
[52] U.S. Cl. ...................... 210/137; 210/177; 210/189; 210/266; 210/268; 210/269; 210/284
[58] Field of Search ..................... 210/664, 676, 210/685, 177, 189, 268, 269, 279, 284, 137, 266

[56] References Cited

U.S. PATENT DOCUMENTS

| | | | |
|---|---|---|---|
| 2,815,322 | 12/1957 | Higgins | 210/33 |
| 2,841,550 | 7/1958 | Beohner et al. | 210/26 |
| 3,197,401 | 7/1965 | Arai | 210/664 |
| 3,205,168 | 9/1965 | Mihara et al. | 210/33 |
| 3,243,318 | 3/1966 | Mihara et al. | 135/25 |
| 3,244,561 | 4/1966 | Mihara et al. | 127/46 |
| 3,342,730 | 9/1967 | Mihara et al. | 210/38 |
| 3,378,339 | 4/1968 | Yamashiki | 23/100 |
| 3,403,097 | 9/1968 | Yamashiki et al. | 210/33 |
| 3,458,438 | 7/1969 | Smith et al. | 210/664 |
| 3,642,616 | 2/1972 | Burns | 210/673 |
| 4,293,423 | 10/1981 | Kosaka et al. | 210/676 |

FOREIGN PATENT DOCUMENTS

| | | |
|---|---|---|
| 1803202 | 6/1969 | Germany . |
| 2723297 | 12/1978 | Germany . |
| 38-5104 | 1/1963 | Japan . |
| 38-12508 | 2/1963 | Japan . |
| 39-8795 | 5/1964 | Japan . |
| 40-25496 | 11/1965 | Japan . |
| 41-1336 | 2/1966 | Japan . |
| 59-50379 | 12/1984 | Japan . |
| 61-14863 | 4/1986 | Japan . |
| 1590103 | 10/1977 | United Kingdom . |

OTHER PUBLICATIONS

Patent Abstracts of Japan, vol. 13, No. 249 (C–605), Jun. 9, 1989, JP–1–056186, Mar. 3, 1989.
Chemical Engineering Progress, vol. 65, No. 6, Jun. 1969, pp. 59–62, Irwin R. Higgins, "Continuous Ion Exchange of Process Water".
Ion Exchange, A Countercurrent Solid–Liquid Contact For Continuous Ion Exchange, Irwin R. Higgins et al.; New York 1954, pp. 87–92.
Demineralization By Ion Exchange, In Water Treatment and Chemical Processing Of Other Liquids, New York and London, 1968, Samuel B. Applebaum, pp. 341–355.
Water Treatment Handbook, Fifth Edition, 1979, pp. 333–337.

Primary Examiner—Ivars Cintins
Attorney, Agent, or Firm—Oblon, Spivak, McClelland, Maier & Neustadt, P.C.

[57] ABSTRACT

Disclosed is a novel continuous ion exchange apparatus capable of performing both ion exchange treatment and regeneration treatment within a single column by the use of ion exchange resin(s) whose ion exchange abilities can be regenerated by acid or alkali. The apparatus comprises a resin column or two including an adsorption zone, a washing zone, a regenerating zone sequentially sectioned from the bottom toward the top; a resin extraction transfer means for withdrawal the ion exchange resin from the bottom of the column and transferring them to a metering container disposed on the top of the column; a resin supply means for supplying the ion exchange resin within the metering container to the top of the column, a water passage system allowing the supply of feed water into the interior of the column from the bottom of the adsorption zone and allowing discharge of the treated water from the top of the adsorption zone to the exterior of the column; and a regenerant passage system allowing the supply of the regenerant from the bottom of the regeneration zone into the interior of the column and discharge of regenerant waste from the top of the regeneration zone to the exterior of the column.

19 Claims, 2 Drawing Sheets

CONTINUOUS ION EXCHANGE APPARATUS

BACKGROUND OF THE INVENTION

1. Field of the Invention

The present invention relates generally to a continuous ion exchange apparatus, and more particularly to a two-bed type or other continuous ion exchange apparatus, e.g., for use in the production of high purity water such as deionized water in which the feed water is upwardly passed through an ion adsorption zone, a washing zone, a resin regeneration zone sequentially segmented from the lower portion to the upper portion within a single column filled with an ion exchange resin while the ion exchange resin is transferred downward or in the opposite direction to the feed water passage direction in such a manner that the ion exchange resin which has been regenerated and washed can be continuously supplied into the adsorption zone from the upper portion, thereby executing a substantially continuous ion exchange treatment of the feed water passing through the adsorption zone.

2. Description of the Related Arts

A typical apparatus for the production of high purity water such as deionized water hitherto known is a fixed-bed type ion exchange apparatus in which an ion exchange treatment and a regeneration treatment by the passage of a regenerant are alternately performed. However, the apparatus has a poor productivity due to the interruption of the passage of feed water during the regeneration treatment, and hence is unsuitable for the application requiring a successive supply of water. For this reason, various apparatuses allowing a continuous ion exchange treatment without being interrupted have been put into practical use.

The continuous ion exchange apparatuses are classified into a fluidized bed type and a moving bed type, the latter being industrially commonly used and subgrouped into a mixed bed type and a multiple-bed type.

The mixed bed type continuous ion exchange apparatus comprises an exhaustion (adsorption) column mixedly filled with cation exchange resin and anion exchange resin, a resin separation column, and a couple of regeneration columns. In this apparatus, feed water is introduced into the exhaustion column through the lower portion thereof, to force the mixed resin bed toward the top of the exhaustion column to form a fixed bed, subjecting the feed water passing therethrough to an ion exchange treatment. This will allow a gradual upward movement of the ion exchange zone in which ion exchange takes place within the mixed resin bed through which the feed water passes. The resins exhausted with impurity ions (the resins whose ion exchange ability to adsorb impurity ions have been spent) are transferred as a slurry through the bottom of the exhaustion column to the resin separation column in which the resin slurry is backwashed and separated into the cation exchange resin and anion exchange resin, and then sent to their respective regeneration columns. The ion exchange resins regenerated in these columns are metered and mixed, and then fed to the top of the interior of the exhaustion column while interrupting (usually about several ten seconds) the passage of feed water through the exhaustion column, thereby accomplishing a substantially continuous ion exchange.

On the other hand, the multiple-bed type continuous ion exchange apparatus is represented by a deionized water production unit called, for example, two-bed type without or with a decarbonator. In the two-bed type without a decarbonator, the feed water is passed through a cation column (hereinafter referred to also as "column C") filled with a cation exchange resin, and then passed through an anion column (hereinafter referred to also as "column A") filled with an anion exchange resin. The two-bed type continuous ion exchange apparatus with a decarbonator further comprises a decarbonator interposed between the columns C and A for the purpose of reducing the ion load on the column A.

The above-described multiple-bed type continuous ion exchange apparatus, for example, the two-bed type apparatus with a decarbonator may be actually called a two-bed seven-column type since in addition to the decarbonator column each of the columns C and A needs one regeneration column (for regenerating the cation or anion resin) plus a wash column (for washing the cation or anion resin after regeneration.) Such a number of columns (or vessels) entails a great deal of additional equipment such as piping and valves necessary for the resin transfer, which in turn results in an increased equipment cost, and a larger space for installation, and a complicated operation.

In contrast, the mixed bed type continuous ion exchange apparatus has an advantage over the multiple-bed type in the case where the quality of the feed water is comparatively good, the content of weak acidic components such as carbonic acid or silica (silicic acid) in the feed water is low, the quantity of the feed water to be treated is great, or the space for installation is restricted. Nevertheless, the mixed bed type apparatus has some drawbacks, for example, 1) it needs more alkaline regenerant than the multiple-bed type continuous ion exchange apparatus having a decarbonator since the anion exchange resin used for the mixed bet unit adsorbs bicarbonate ions and the like as well as the other anions, and 2) the cation exchange resin may be mixed into the anion exchange resin regeneration column due to insufficient separation of the cation exchange resin and the anion exchange resin within the resin separation column whereupon calcium ions or magnesium ions the cation exchange resin has adsorbed may become insoluble in the anion exchange resin regeneration column after the elution from the cation resin, thereby clogging a collector and so on. In this manner, the continuous ion exchange apparatuses which have been hitherto put into practice leave much to be desired irrespective of whether they are mixed bed type or multiple-bed type.

Apart from the above-described known continuous ion exchange apparatus, the present applicant has proposed a continuous ion exchange apparatus using thermally regenerable special ion exchange resins (see Japanese Patent Pub. No. 50379/1984). This continuous ion exchange apparatus utilizes the special properties of the thermally regenerable resins whose ion exchange capacity can be regenerated by hot water, to thereby execute both the ion exchange treatment and the regeneration treatment within a single treatment column.

The present inventor has considered, due to the speciality of the resin used, that the continuous ion exchange apparatus using the thermally regenerable resins will not be directly applicable to the continuous ion exchange apparatus using the ion exchange resins whose ion exchange abilities are recovered by ordinary acid or alkali. However, despite the shortcomings such for example as mixing of the regenerant into the treated water which may be caused by insufficient washing, deterioration in the washing efficiency which may be caused by the increase in the volume of washing water, or reduction in the recovery of the feed water, it has considerable advantages. For example, there is no need to separately provide any column for the regeneration since the ion exchange treatment and the regeneration can be carried out within a single column, contributing to the elimination or reduction of the drawbacks such for example as a larger space required for installation of the two-bed type apparatus described above. Thus, the present inventor has continued studying the wider application of the continuous ion exchange apparatus designed for thermally regenerable resins.

SUMMARY OF THE INVENTION

The present invention was conceived as a result of the research and development from the viewpoint described above.

The purpose of the invention is to achieve the following objectives.

[1] To provide a novel continuous ion exchange apparatus capable of performing both the ion exchange treatment and the regeneration within a single column by use of ion exchange resin(s) whose ion exchange abilities can be regenerated by acid or alkali, and hence not requiring the provision of any separate regeneration and washing columns, and ensuring a reduction of the installation space and the amount of piping and the number of valves.

[2] To provide a novel continuous ion exchange apparatus allowing the reduction in the column height and thereby reducing space required for the installation.

[3] To provide a continuous ion exchange apparatus capable of reducing the cost for the production of the treated water by minimizing both the installation and running costs.

[4] To provide a continuous ion exchange apparatus not requiring any washing water supply piping system, by utilizing the treated water for washing the cation or anion resin which has been regenerated by a regenerant within a single column.

[5] To provide a continuous ion exchange apparatus minimizing attrision of the ion exchange resins by minimizing the transfer distance of the ion exchange resins and the number of valves and the like required within the transfer piping.

[6] To provide a continuous ion exchange apparatus minimizing the variation of the quantity of water passing through regeneration and washing zones which may be caused by a pressure change within the column, thereby ensuring stable and secure regeneration and washing.

[7] To provide a continuous ion exchange apparatus capable of effectively preventing the regenerant waste (acid or alkali) from flowing out toward the treated water side to thereby stably ensure a high quality of the treated water.

In order to achieve the above objects, the present inventor has completed the present invention as defined in the appended claims.

More specifically, one of the features of the present invention lies in providing a continuous ion exchange apparatus composed of a cation column—a decarbonator (degasifier)—an anion column.

The cation column (column C) comprises a column body filled with a cation exchange resin in which an adsorption zone, a washing zone, and a regeneration zone are sequentially provided in that order from the bottom toward the top of the column body; a resin withdrawal and transfer means for withdrawing the spent cation exchange resin from the bottom of the column body and transferring it to a metering container disposed on the top of the column body; a resin supply means for supplying, as required, the cation exchange resin within the metering container to the top of the interior of the column body; a water passage means allowing the supply of the feed water from the bottom of the adsorption zone into the interior of the column body and discharge of the treated water from the top of the adsorption zone to the exterior of the column body; and a regenerant passage means allowing the supply of the acidic regenerant to the regeneration zone from its lower portion and allowing discharge of the regenerant waste from the upper portion of the regeneration zone.

The decarbonator (column D) is provided as a second column for removing the carbonic acid contained in the treated water (acidic decationized water) to be discharged from column C.

The anion column (column A) comprises a third column filled with an anion exchange resin in which an adsorption zone, a washing zone, and a regeneration zone are provided sequentially in that order from the bottom toward the top of the column; a resin withdrawal and transfer means allowing withdrawal of the spent anion exchange resin from the bottom of the column and allowing the transfer thereof to a metering container disposed on the top of the column; a resin supply means for supplying the anion exchange resins within the metering container to the upper portion of the column; a water passage means allowing acidic decarbonated water obtained by the treatment within the decarbonator to be supplied from the lower portion into the interior of the anion column and allowing the treated water to be discharged from the upper portion of the adsorption zone to the exterior of the column; and a regenerant passage means allowing the alkaline regenerant to be supplied to the regeneration zone from its lower portion and allowing the regenerant waste to be discharged from the upper portion of the regeneration zone to the exterior of the column.

The columns C, D and A are connected in series in that order. It will be appreciated that the cation column (column C) consists of a column body, a water passage system associated therewith, and a resin transfer system. The same applies to the anion column.

The continuous ion exchange apparatus of the present invention composed of the columns C-D-A for the production of deionized water effects, in the same manner as the conventional two-bed (with a decarbonator) type continuous ion exchange apparatus, a cation exchange treatment, a decarbonating treatment, and an anion exchange treatment in that order. However, the apparatus of the invention significantly differs in configuration from the conventional one in that each of the columns C and A executes both the ion exchange treatment and the regeneration treatment in a single column, thereby eliminating the need to separately provide any additional regeneration or washing column.

In the above configuration of the continuous ion exchange apparatus of the invention, the cation column (column C) and the anion column (column A) may each be provided with a water flow control means to ensure that a ratio beta/alpha is equal to or less than one, alpha represents the rate of variance in the flow rate of the treated water discharged from the upper portions of the absorption zone for the ion exchange treatment of the feed water to the exterior of the column, beta represents the rate of variance in the flow rate of the regenerant water discharged from the upper portion of the regeneration zone to the exterior of the column.

It is preferable to ensure by this flow control means that the variation in the flow rate of the treated water discharged from the upper portion of the adsorption zone is substantially the same as the variation in the flow rate of the regenerant waste discharged from the upper portion of the regeneration zone, or that the variation in the flow rate of the regenerant waste discharged from the upper portion of the regeneration zone is less than the variation in the flow rate of the treated water discharged from the upper portion of the adsorption zone.

In the case of the column C, for example, if the flow rate of the treated water supplied from the cation column (column C) is regulated to control the level of water within the decarbon-ator (column D), it is preferred that the variation be sufficiently suppressed in the flow rate of the regenerant waste discharged from the upper portion of the regeneration zone of the column C. Usually, the variation in the flow rate of the treated water discharged from the upper portion of the adsorption zone will be accompanied by a pressure change in the upper portion of the adsorption zone. This pressure change in the adsorption zone may bring about a significant variation in the flow rate of the regenerant waste discharged from the upper portion of the regeneration zone, which may in turn cause the following inconveniences. That is, if the amount of treated water discharged from the upper portion of the adsorption zone is restricted with the pressure of the feed water supplied to the lower portion of the adsorption zone being constant, the upper portion of the adsorption zone is pressurized to allow the increase of the flow rate of the treated water (acidic deionized water) upwardly passing into the washing zone, resulting in a reduction of the recovery of the feed water as the treated water. Also, the regenerant fed into the regeneration zone may be diluted by a large volume of treated water passing upward through the washing zone, which may prevent a sufficient regeneration of the cation exchange resin within the regeneration zone. In consequence, descent of the cation exchange resin which has not yet been fully regenerated from the regeneration zone through the washing zone into the adsorption zone might possibly cause a reduction in the purity of the treated water.

On the other hand, an increase of the flow of feed water discharged from the upper portion of the adsorption zone will depressurize the upper portion of the adsorption zone, and hence decrease the flow of treated water passing upward through the washing zone. This may result in insufficient washing of the cation exchange resin retained within the washing zone. Consequently, the cation exchange resin from which any residual regenerant has not yet been fully removed may drop into the adsorption zone, which in turn allows the regenerant to be mixed into the treated water and may possibly deteriorate the quality of the treated water to be discharged.

In order to overcome the above problems, the flow rate regulating means described above is effective. Such flow rate regulation means may be comprised of means with which the internal pressure in the upper portion (a position at which the treated water is discharged from the adsorption zone to the exterior of the column) of the adsorption zone is set to exceed a head loss which is brought about by the height difference between the upper portion of the adsorption zone and the upper portion (a position at which the regenerant waste is discharged to the exterior) of the regeneration zone. More specifically, such flow control means may be devised by the provision of an outlet valve for regulating the outlet flow rate of the treated water discharged from the adsorption zone or additional provision of an outlet valve for regulating the outlet flow rate of the regenerant waste which may be employed along with the treated water outlet valve. However, these are merely non-limitative examples. More concretely, if the difference in height from the upper portion of the adsorption zone to the upper portion of the regeneration zone is equal to or less than 1.5 m, then the ratio beta/alpha of the rates of variation can be made not more than 1 by setting the internal pressure in the upper portion of the adsorption zone at 0.5 Kgf/cm2 or more through the adjustment of the treated water outlet valve and so on. For this reason, the flow rate of the regenerant waste discharged from the regenerate waste outlet can be stably maintained by the control of the regenerant waste outlet valve, irrespective of, for example, the turbidity of the feed water, clogging of the collector located in the upper portion of the adsorption zone which may be caused by resin fines, or the change of the internal pressure due to the regulation for the opening or closing of the flow rate control valve for the water level adjustment within the column D. Thus, a stable washing of the resin can be secured. The higher the internal pressure in the upper portion of the adsorption zone, the smaller the variation in the flow rate of the regenerant waste discharged from the regenerant outlet valve, which will ensure a adequate washing of the resin. Accordingly, the ratio b/a of the rates of variation is preferably equal to or less than 1, and more preferably equal to or less than 0.5.

In the anion column (column A) thus configured, heated washing water may be supplied to between the upper portion of the adsorption zone and the lower portion of the regeneration zone. The provision of this heated washing water supply means will ensure not only the increase in the removal efficiency of the silica which is adsorbed on the anion exchange resin, but also promotion of the effect of washing the anion exchange resin.

Another feature of the present invention lies in providing a single-bed single-column type continuous ion exchange apparatus filled with a strong acidic anion exchange resin ensuring soft water production. More specifically, such a single-bed single-column type continuous ion exchange apparatus can be implemented by a configuration comprising (1) a resin column filled with an ion exchange resin and having an adsorption zone, a washing zone, and a regeneration zone sequentially formed from the bottom of the column, (2) resin withdrawal and transfer means for allowing the withdrawal of the ion exchange resin from the bottom portion of the resin column and the transfer to a metering container disposed on the upper portion of the column, (3) resin supply means for supplying the ion exchange resin within the metering container to the upper portion of the resin column, (4) water passage means allowing the supply of the feed water from the lower portion of the adsorption zone into the interior of the resin column and discharge of the treated water from the upper portion of the adsorption zone to the exterior of the column, (5) regenerant passage means allowing the supply of the regenerant to the regeneration zone from its lower portion and the discharge of the regenerant waste from the upper portion of the regeneration zone to the exterior of the column, and (6) flow rate control means with which a ratio beta/alpha is set to be not more than 1, preferably not more than 0.5 where alpha is a rate of variation in flow rate of the treated water drawn from the upper portion of the adsorption zone to the exterior of the column, and beta is a ratio of variation in the flow rate of the regenerant waste from the upper portion of the regeneration zone to the exterior of the column.

The ratio of the rates of variation beta/alpha exceeding 1 would disadvantageously lead to inadequate washing of the resin, dilute the regenerant, lower the recovery of the treated water from the feed water or lower the purity of the treated water.

According to the present invention, the above-described two-bed type (with a decarbonator) deionized water production unit can be constituted by combining the above-described single-bed single-column (cation and anion) continuous ion exchange apparatus with a decarbonator. When a single ion exchange column is used, it may constitute a soft water production unit, or a valuable metal single column recovery unit.

In this manner, the apparatus of the present invention thus configured has enabled, for the first time, the conventional continuous ion exchange apparatus having a simple configuration and requiring special thermally regenerable resins to be used as an apparatus allowing the use of ion exchange resins which can be chemically regenerated.

DESCRIPTION OF THE PREFERRED EMBODIMENTS

The present invention will now be described with reference to the accompanying drawings which exemplarily illustrate preferred embodiments thereof.

Embodiment 1

Figure 1:
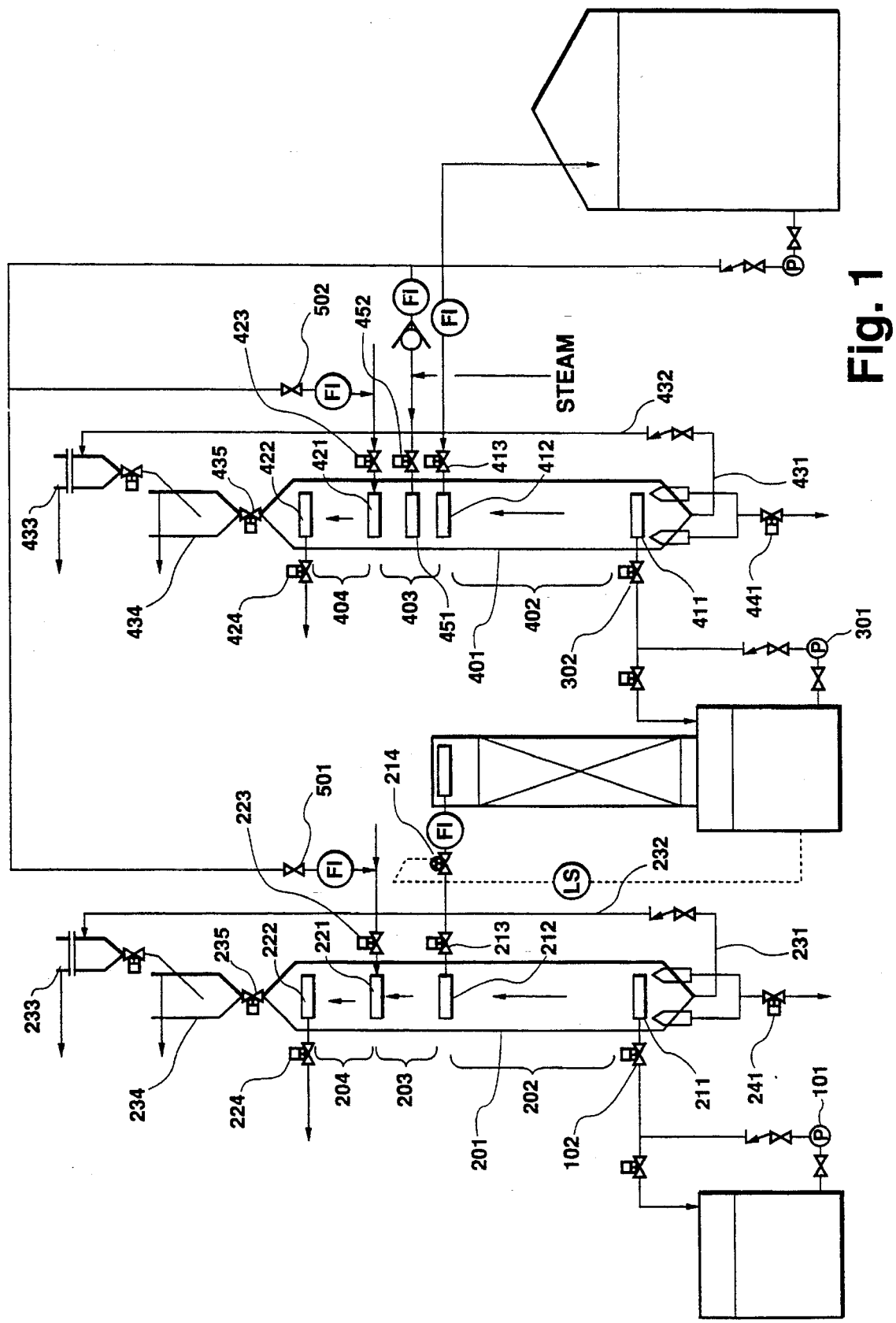
FIG. 1 schematically depicts an exemplary configuration of a multiple(two)-bed type continuous ion exchange apparatus in accordance with a first embodiment of the present invention.

Referring first to FIG. 1, there is depicted a continuous ion exchange apparatus of this embodiment, which is a type similar to the conventional two-bed (with a decarbonator) deionized water production unit, in which feed water from a feed water tank 1 is passed through a cation column 2, a decarbonator 3 and an anion column 4 in that order for the treatments of cation exchange, decarbonation and anion exchange, respectively, to produce high purity deionized water, the thus produced deionized water being stored in a deionized water tank 5. The above-described cation column 2 and anion column 4 have a common structure except that they are filled with different resins and that in this embodiment the anion column 4 is separately provided with a heated washing water supply means.

Description will be given of the structure of the cation column 2. The cation column 2 comprises an elongated column body 201 having a height of the order of several meters, the interior of the column body being filled with a cation exchange resin. A feed water passage system includes a distributor 211 and a collector 212, while an acid regenerant (e.g. hydrochloric acid) passage system includes a distributor 221 and a collector 222. Within the column body, there are formed, in sequential order from below, an adsorption zone 202 through which the feed water is passed from the distributor 211 to the collector 212 in the lower half of the column, a washing zone 203 through which a part of the ion-exchanged treated water (decationized water) is passed from the water passage system collector 212 to the regenerant passage system distributor 221, and a regeneration zone 204 in which the regenerant passage system distributor 221 supplies the acid regenerant to the collector 222.

By means of a feed water supply pump 101, feed water is supplied from the feed water tank 1 via a water passage system inlet valve 102 to the water passage system distributor 211. The feed water is then subjected to an ion exchange treatment with the cation exchange resin during the passage through the adsorption zone 202, most of the treated water being discharged to the exterior via the collector 212 from a water passage system outlet valve 213. A flow rate control valve designated as 214 is disposed downstream of the water passage system outlet valve 213 and serves to control the flow rate of the treated water derived from the cation column 2 in response to the level information detected by a level sensor LS, thereby controlling the water level in the decarbonator 3 which will be described later. It is to be noted that the passage of the feed water pushes the cation exchange resin within the column against the top portion of the column as a whole, forming a fixed resin bed in the column. With the passage of the feed water, the zone of the cation exchange resin adsorbing impurity ions in the adsorption zone 202 is gradually moved upward.

The regenerant passage system distributor 221 is supplied through an inlet valve 223 with a regenerant solution prepared by concentrated hydrochloric acid from a regenerant tank not shown and deionized water from the deionized water tank 5. The regenerant solution thus supplied is brought into contact with the cation exchange resin in the regeneration zone 204 to regenerate the resin, with the acidic regenerant waste being drained away via the collector 222 through an outlet valve 224. It is essential to the apparatus of this embodiment to ensure a secure regeneration treatment (recovery of the ion exchange ability) with a regenerant and to prevent the regenerant from moving to the adsorption zone. It is therefore preferable, from a practical point of view in relation with resin drop process steps which will be intermittently performed as described later, to supply highly concentrated hydrochloric acid as a regenerant for secure regeneration in the former half of the duration from one resin drop to the next resin drop, and to supply in the latter half dilute hydrochloric acid or only the washing water from the washing zone without supplying any hydrochloric acid. Such a change in concentration of the hydrochloric acid can be done, for example, by the opening/closing (throttling) control of a valve 501 (designated at 502 for the anion column 4) provided on a water supply system from the deionized water tank 5.

In the washing zone 203, a part of the ion-exchanged treated water (acidic decationized water) obtained through the adsorption zone 202 flows upward as washing water to wash and remove the regenerant in the regenerated resins. The washing water further flows upward and is mixed in with the regenerant in the regeneration zone 204. The washing water is thus used to dilute the in-flow regenerant and is then drained through the regenerant outlet valve 224 to the exterior of the column.

The above are the liquid flows in the water passage system and the regenerant passage system in the cation column 2.

Description will next be given of the flow (movement) of the resin in the cation column. The resin which has adsorbed impurity ions is withdrawn from the bottom of the column through a resin withdrawal pipe 231, and then transferred through a transfer pipe 232 to a metering container 233 disposed on the top of the column. The transfer of the resin is stopped when the metering container 233 becomes full of the resin. The transfer of the resin is carried out by the water pressure of the feed water introduced from the distributor 211. During the resin transfer, the resin within the column remains fixedly pressed against the top of the column. The resin metered by the metering container 233 is dropped to a hopper 234, and are then ready for the supply through a normally closed type resin supply valve 235 into the top of the column body 201. Here it should be mentioned that the hopper 234 may be used for removing resin fines or for the replenishment of new resin.

In the cation column 2 thus configured, upon the lapse of a predetermined water passing time, the transfer of the resin is carried out through a short-time resin drop process step which will be described below. That is, the inlet valve 102 is closed and a drain valve 241 is temporarily opened to partially discharge the water within the column to the exterior. This will permit the resin within the column to drop by gravity, while the resin supply valve 235 is simultaneously opened allowing the resin to be supplied from the hopper 234 to the upper portion of the column. Afterwards, the valves return to their respective normal states to resume the passage of the water through the water passage system.

In this manner, operations of passing water for a predetermined time and of transiently dropping the resin are cyclically repeated in the cation column 2 to enable the passage of water and regeneration to be continuously executed within a single column.

The ratio beta/alpha in this embodiment between a rate alpha of variation in the outflow flow rate of the water passage system and a rate beta of variation in the discharge flow rate of the regenerant passage system can lie within the above-described range, that is, beta/alpha $\leq 1$ by appropriately setting the opening of the water passage system outlet valve 213 and the regenerant passage system outlet valve 224.

The structure of the anion column 4 will now be described. The anion column 4 has a basic structure identical to that of the cation column 2, in which the ion exchange treatment by the passage of water and the regeneration treatment of resin by the regenerant can be effected within a single column to constitute a single-bed single-column structure. Accordingly, for the simplicity of description, constituent elements of the anion column corresponding to those of the cation column are designated by reference numerals obtained by adding 200, respectively, to the numerals of the corresponding elements of the cation column. The description of the common elements will be omitted, and only elements which are different will be described.

The interior of the anion column 4 is filled with an anion exchange resin, and the acidic decarbonated water derived from the decarbonator 3 is supplied via an inlet valve 302 to a distributor 411. Also, the regenerant passage system is supplied via an inlet valve 423 with a mixture of a caustic soda solution (NaOH) from a regenerant tank not shown and deionized water from the deionized water tank 5, the mixture solution in the regeneration zone 404 being brought into contact with the anion exchange resin for the regeneration thereof, allowing the alkaline regenerant waste to be discharged from the collector 422 via an outlet valve 424 to the exterior of the column.

To promote the efficiency of regenerating the anion exchange resin, in this embodiment, a heated washing water supply means is additionally provided. More specifically, a heated washing water system distributor 451 is interposed between a water passage system collector 412 and a regenerant passage system distributor 421, and is supplied, via an inlet valve 452, with washing water heated by steam. By virtue of the provision of this heated washing water supply means, the full amount of the treated water (deionized water) in the adsorption zone may be supplied through an outlet valve 413 into the deionized water tank 5 without diverting any part of the treated water (deionized water) from the absorption zone to the washing zone. Further, the use of the deionized water as the heated washing water will be convenient because no problem of contamination arises even when the water from the heated washing water system flows into the collector 412 of the water passage system.

Also in this anion column, the ratio beta/alpha between a rate alpha of variation in the outflow flow rate of the water passage system and a rate beta of variation in the discharge flow rate of the regenerant passage system can lie within the above-described range, that is, beta/alpha $\leq 1$, by appropriately setting the opening of the water passage system outlet valve 413 and the regenerant passage system outlet valve 424.

Although the resin drop in the anion column and the resin drop in the cation column may be simultaneously carried out, it is preferable to stagger these resin drops in view of the facilitation of maintenance such as regulation of the amount of resins to be circulated, and in view of ensuring an optimum and efficient operation in response to any variation in the quality of the feed water.

The decarbonator (column D) 3 may be of the same type as used for the conventional two-bed (with a decarbonator) continuous ion exchange apparatus. The level of the water within a bottom tank of the decarbonator is detected by a level switch (LS) so that the flow rate from the water passage system of the cation column 2 can be regulated by a flow rate regulation valve 214.

The continuous ion exchange apparatus having the above structure will reduce the space required for the installation and the number of the columns (vessels) and valves, and piping and will constitute equipment ensuring easy control of operation and reduction in the production cost of the deionized water.

Embodiment 2

Figure 2:
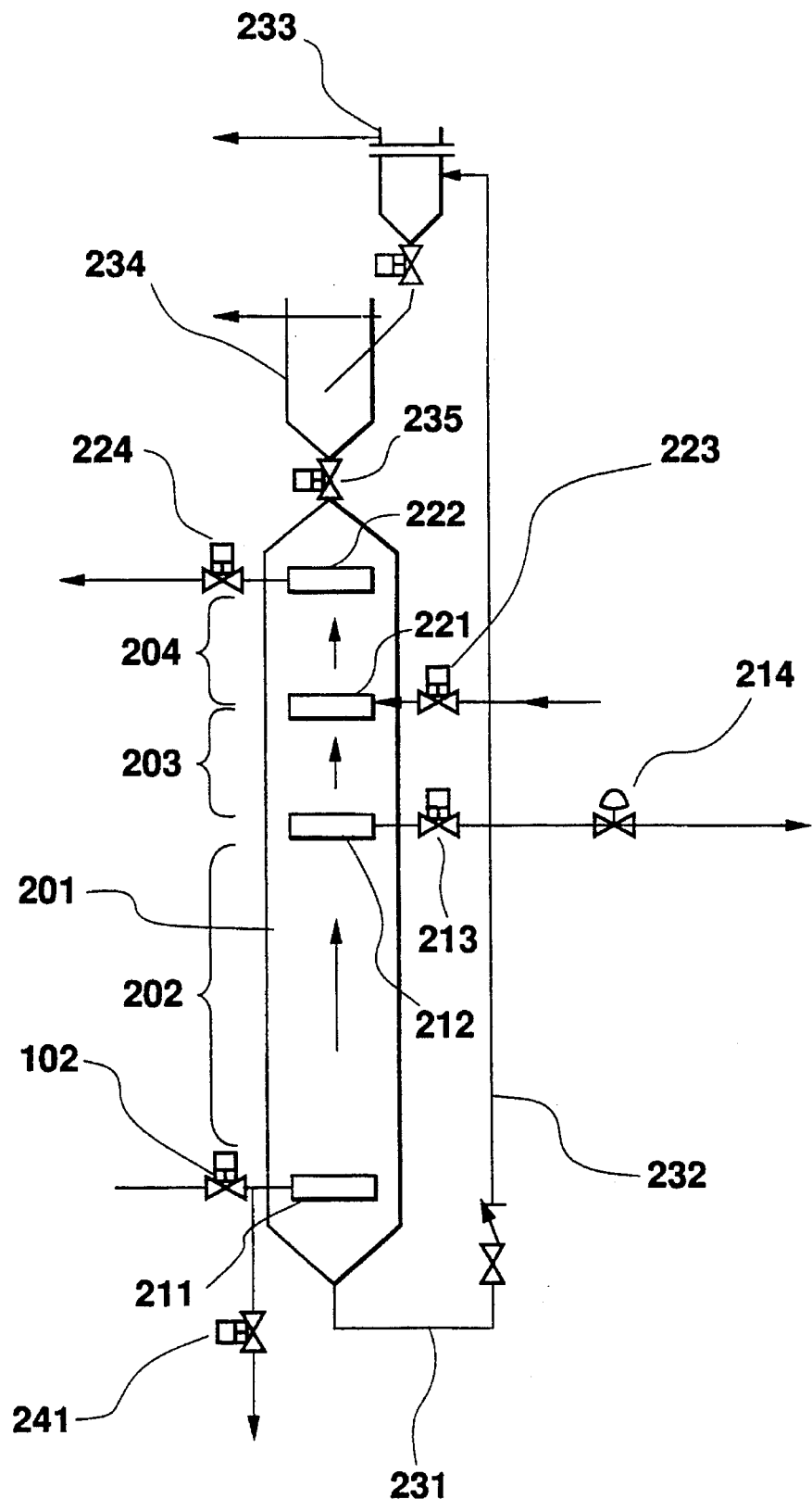
FIG. 2 schematically depicts an exemplary configuration of a continuous ion exchange apparatus for producing soft water in accordance with a second embodiment of the present invention.

Referring to FIG. 2, there is depicted a continuous ion exchange apparatus of this embodiment, charged with a cation exchange resin to serve as a soft water production unit of single-bed single-column type. This apparatus can be comprised of substantially the same structure as that of the cation column 2 in the embodiment 1. Therefore, common elements are designated by the same reference numerals, and the description thereof will be omitted. A sodium chloride solution is used as a regenerant.

According to this embodiment, there is provided a continuous ion exchange apparatus enabling substantially continuous supply of soft water which may be used as, for example, low-pressure boiler water, cleaning water or process water, the apparatus requiring less space for the installation and a reduced number of column(vessels) and valves and piping, and being capable of constituting equipment ensuring easy control of operation and curtailment in the production cost of the soft water.

Test Example

Using the apparatus of the embodiment 1, a test for the production of deionized water was performed under the following conditions.

Apparatus Dimensions
    Cation Column: overall height 4200 mm
        column body: 2400 mm×200 dia. (adsorption zone: 1200 mm washing zone: 500 mm regeneration zone: 300 mm)
        hopper: 15 lit.
        metering container: 2.5 lit.
    Anion Column: overall height 4200 mm
        column body: 2400 mm×200 dia. (adsorption zone: 1200 mm washing zone: 500 mm regeneration zone: 300 mm)
        hopper: 15 lit.

metering container: 2.5 lit.

Decarbonator: height; 2500 mm, diameter; 250 mm (bottom tank capacity; 500 lit.)

Ion Exchange Resins:
 cation exchange resin: Amberlite 200 85 lit. (manufactured by Rohm & Haas Company) anion exchange resin :Amberlite IRA-910 85 lit. (manufactured by Rohm & Haas Company)

Test Conditions

Treated Water Quantity: 2.56 m3/h

Treated Water Quality:
 total cations; 100 mg as $CaCO_3$/lit. (cation load: 5.1 eq/h)
 total anions; 120 mg as $CaCO_3$/lit.
 bicarbonate Ions; 26 mg as $CaCO_3$/lit.
 free carbon Dioxide; 10 mg as $CaCO_3$/lit
 silica; 10 mg as $CaCO_3$/lit Loading Anion 90 mg as $CaCO_3$/lit.(anion load: 4.6 eq/h)

Cation Column Resin Circulation Amount: 6.4 lit./h

Anion Column Resin Circulation Amount: 6.0 lit./h

Cation Column Resin Drop Height: 8.0 cm

Anion Column Resin Drop Height: 8.0 cm

Hydrochloric Acid Consumption: 6.7 eq/h (approx. 560 ml-35% HCl/h)
 regeneration level; 1.3 times the stoichiometoric value Caustic Soda Consumption : 6.0 eq/h (approx. 720 ml-25% NaOH/h)
 regeneration level; 1.3 times the stoichiometoric value Ratio of Flow Rate Variation in Cation Column: beta/alpha=0.5

Ratio of Flow Rate Variation in Anion Column: beta/alpha=0.5

Test Results

Quantity of Deionized Water Obtained: 2.50 m3/h (recovery; 97.7%)

Quality of Water Obtained: conductivity 0.5 µS/cm; silica 18 µg as $SiO_2$

As is apparent from these test results, the continuous ion exchange apparatus of the embodiment 1 is capable of constituting two-bed (with a decarbonator) continuous ion exchange apparatus, requiring a smaller installation space and a continuous supply of deionized water of higher quality when compared with the conventional two-bed (with a decarbonator) continuous ion exchange apparatus requiring separate regeneration and wash columns, etc.

As described above, the continuous ion exchange apparatus of the present invention will exhibit the following effects.

[1] Using a cation or an anion ion exchange resin which can be regenerated by acid or alkali, both ion exchange treatment and regeneration treatment can be effected within a single column. Accordingly, there is no need for the provision of conventional separate regeneration and washing columns, leading to a reduction in the installation area and a reduced amount of piping and valves which will facilitate the control of operation.

[2] In the conventional continuous ion exchange apparatus, typically, the regenerant passage rate (linear velocity) was set at 10 m/h to fix the resin layer in the upper portion of the regeneration column for the efficient regeneration, and the regeneration column was set at about 500 cm or greater to secure an adequate time of contact between the resin and the regenerant. In the continuous ion exchange apparatus of the present invention, the passage of the feed water through the interior of the column executing an ion exchange treatment pushes the resin toward the upper portion of the column to form a fixed bed whereupon the height of the regeneration zone required has only to be determined in order to secure the adequate time during which the regenerant comes into contact with the resin. As a result, the column height can be reduced to about ¾ to ½ (under 1/10 in the regeneration zone) compared with the conventional apparatus, and a necessary installation space can be largely decreased.

[3] The treated water which has passed through the adsorption zone within a single column is used, in the same column, as washing water, thereby eliminating the necessity of providing a washing water supply piping system which has been indispensable for the conventional washing column. In consequence, the height of the column can be reduced compared with the conventional apparatus, and the number of components such as piping and valves can be largely decreased.

[4] The above [1] to [3] will reduce not only the installation cost but also the running cost due to less number of valves to be controlled, thus realizing a reduction in the treatment and production costs.

[5] A shorter transfer distance of the ion exchange resins, reduced frequency of resin transfers, and reduced number of valves through which the ion exchange resins pass during the transfer will contribute to minimizing attrition loss of the ion exchange resins and to an extension of the life of the resins, and therefore to the effective utilization of resources and reduction of the waste materials.

[6] Variation in washing and regeneration flow ratio due to a pressure change within the column can be diminished to ensure a stable and secure chemical regeneration treatment using acid and alkali.

[7] The above [6] will result in effective prevention of outflow of the regenerant toward the treated water side (adsorption zone), thereby ensuring a stable and high quality of the treated water.

What is claimed is:

1. A multiple-bed type continuous ion exchange apparatus comprising:

a cation column filled with cation exchange resin for performing cation exchange treatment of feed water;

a decarbonator, coupled to said cation column such that water treated in said cation column may be transferred to said decarbonator, for removing carbonic acid contained in the treated water which has undergone the cation exchange treatment in the cation column;

and an anion column, coupled to said decarbonator such that water decarbonated by said decarbonator may be transferred to said anion column, filled with anion exchange resin for treating acidic decarbonated water from the decarbonator;

wherein said cation column includes an adsorption zone, a washing zone, and a regeneration zone sequentially sectioned from the bottom of the column toward the top thereof, respectively, and said cation column is filled with the cation exchange resin;

wherein said anion column includes an adsorption zone, a washing zone, and a regeneration zone sequentially sectioned from the bottom of the column toward the top thereof, respectively, and said anion column is filled with the anion exchange resin;

wherein:

said cation column includes a first flow rate control means for controlling a ratio beta(1)/alpha(1) to be less than one, alpha (1) is a rate of variation in the flow rate of the treated water which has undergone the cation exchange treatment and which is to be discharged from the top of the adsorption zone in said cation column and beta (1) is a rate of variation in the flow rate of the regenerant waste which is to be discharged from the top of the regeneration zone in said cation column;

said anion column includes a second flow rate control means controlling the ratio beta (2)/alpha (2) to be less than or equal to one, alpha (2) is a rate of variation in the flow rate of deionized water which has undergone the anion exchange treatment and which is to be discharged from the top of the adsorption zone in said anion column and beta (2) is the rate of variation in the flow rate of the regenerant waste which is to be discharged from the top of the regeneration zone in said anion column;

means for supplying feed water to an absorption zone of the cation column;

means for discharging treated water from the anion column;

means for supplying cation resin regenerant to the cation column;

means for discharging regenerant waste from the top of the regeneration zone in the cation column;

means for supplying anion resin regenerant to the anion column; and means for discharging regenerant waste from the top of the regeneration zone in the anion column.

2. A continuous ion exchange apparatus according to claim 1, wherein said cation column includes a first water flow passage means for supplying the feed water through the bottom of said adsorption zone and discharging the treated water which has undergone the cation exchange treatment through the top of said adsorption zone, and wherein supply pressure of said feed water force a part of the treated water which has undergone the cation exchange treatment to flow upward into said washing zone.

3. A continuous ion exchange apparatus according to claim 2, wherein said cation column further includes a first regenerant passage means allowing supply of cation resin regenerant through the bottom of said regeneration zone and the discharge of regenerant waste through the top of said regeneration zone.

4. A continuous ion exchange apparatus according to claim 3, wherein said cation column includes a first resin transfer means allowing withdrawal of a part of the cation resin through the bottom of the column and the supply thereof to the top of the column.

5. A continuous ion exchange apparatus according to claim 4, wherein said first resin transfer means consists of:

a first transfer means allowing withdrawal of a part of the cation exchange resin from the bottom of the column and the transfer thereof to a first metering container provided on the top of said cation column; and a first resin supply means for supplying the cation exchange resin within said first metering container to the top of said cation column.

6. A continuous ion exchange apparatus according to claim 4, wherein said anion column includes a second water passage means allowing the supply of the water treated in said decarbonator and the discharge of deionized water which has been obtained by the anion exchange treatment from the top of said adsorption zone, the supply pressure of said treated water forcing a part of treated water which has undergone the anion exchange treatment to flow upward into said washing zone.

7. A continuous ion exchange apparatus according to claim 6, wherein said anion column includes a second regenerant passage means allowing the supply of anion resin regenerant from the bottom of said regeneration zone and the discharge of the regenerant waste from the top of said regeneration zone.

8. A continuous ion exchange apparatus according to claim 7, wherein said anion column includes a second resin transfer means allowing the withdrawal of a part of the anion exchange resin through the bottom of the column and supply thereof to the top of the column.

9. A continuous ion exchange apparatus according to claim 8, wherein said second resin transfer means consists of a second transfer means allowing the withdrawal of a part of the anion exchange resin from the bottom of the column and the transfer thereof to a second metering container disposed on the top of said anion column; and a second resin supply means for supplying the anion exchange resin within said second metering container to the top of said anion column.

10. A continuous ion exchange apparatus according to claim 1, wherein:

said first flow rate control means includes a flow rate regulating means for regulating the flow rate of the treated water which has undergone the cation exchange treatment, to be supplied from said cation column to said decarbonator for the regulation of the level of the water in said decarbonator.

11. A continuous ion exchange according to claim 1, further comprising a heated washing water supply means for supplying heated washing water into the washing zone of said anion column.

12. An apparatus according to claim 1, wherein said means for delivering cation resin regenerant into said cation column delivers cation resin regenerant into said cation column at the top of said washing zone of said cation column.

13. An apparatus according to claim 12, wherein said means for delivering anion resin regenerant into said anion column delivers anion resin regenerant at the top of said washing zone of said anion column.

14. An apparatus according to claim 1, further comprising:

a regenerant distributor in said cation column between said regeneration zone and said washing zone;

a decationized water collector in said cation column between said absorption zone and said washing zone; and means for delivering deionized water into said cation column at the top of said washing zone of said cation column, or at the regenerant distributor.

15. A continuous ion exchange apparatus, comprising:

a resin column including an adsorption zone, a washing zone, and a regeneration zone sequentially sectioned from the bottom toward the top of the resin column, each zone being filled with an ion exchange resin;

a resin transfer means for drawing the resin from the bottom of said resin column and supplying it to the top of said resin column;

a water passage means for supplying feed water to the bottom of said adsorption zone;

means for discharging treated water from the resin column, wherein the supply pressure of said feed water forces a part of said treated water to flow upward into said washing zone;

a regenerant passage means for supplying the regenerant to the bottom of the regeneration zone;

means for discharging regenerant waste from the top of the regeneration zone in the resin column;

wherein said resin column includes a first flow rate control means for controlling a ratio beta (1)/alpha (1) to be less than one, alpha (1) is a rate of variation in the flow rate of the treated water which has undergone the exchange treatment and which is to be discharged from the top of the adsorption zone in said resin column and beta(1) is a rate of variation in the flow rate of the regenerant waste which is to be discharged from the top of the regeneration zone in said resin column.

16. A continuous ion exchange apparatus according to claim 15, wherein said resin column is changed with a strong acidic cation exchange resin for the production of soft water.

17. A continuous ion exchange apparatus according to claim 16, wherein said resin transfer means consists of:

a transfer means allowing withdrawal of a part of the ion exchange resin from the bottom of the column and the transfer thereof to a metering container disposed on the top of said resin column; and a resin supply means for supplying the ion exchange resin within said metering container to the top of said resin column.

18. An apparatus according to claim 15, wherein said ion exchange resin is a cation exchange resin.

19. An apparatus according to claim 15, further comprising:

a regenerant distributor in said resin column between said regeneration zone and said washing zone;

a treated water collector in said resin column between said absorption zone and said washing zone; and means for delivering water into said resin column at the top of said washing zone or at the regenerant distributor.

* * * * *